United States Patent [19]

Groth et al.

[11] Patent Number: 4,714,357

[45] Date of Patent: Dec. 22, 1987

[54] SEGMENTAL BEARING SHOE

[75] Inventors: Ronald W. Groth, Grafton; Robert J. Nowakowski, Mequon, both of Wis.

[73] Assignee: Orion Corporation, Grafton, Wis.

[21] Appl. No.: 869,276

[22] Filed: Jun. 2, 1986

[51] Int. Cl.⁴ .............................................. F16C 17/03
[52] U.S. Cl. .................................... 384/312; 384/626
[58] Field of Search ............... 384/309, 117, 306, 122, 384/626, 312

[56] References Cited

U.S. PATENT DOCUMENTS 4,525,083 6/1985 Pedersen ............................. 384/309
4,580,911 4/1986 Burkhard et al. ................... 384/309

Primary Examiner—Lenard A. Footland
Attorney, Agent, or Firm—Quarles & Brady

[57] ABSTRACT

A bearing shoe for use in segmental bearings that rotatably support a member by means of a plurality of such shoes. Each of the shoes presents a bearing surface on one side for engagement with the rotating surface of the rotary member. The opposite side of the shoe is provided with a pivot for engagement with a complementary surface in the housing of the segmental bearing so that the shoe is able to pivot for adjusting its bearing surface into alignment with the rotating surface of the rotary member. The present invention provides for fabricating the pivot separately from the body of the shoe and fastened thereto. As a result, the spacing of the pivot from the bearing surface of the shoe can be adjusted to vary the characteristics of the segmental bearing. Moreover, the pivot itself is arced along its length to further increase the pivotal capabilities of the shoe for more accurate alignment with the rotating surface of the rotary member.

3 Claims, 7 Drawing Figures

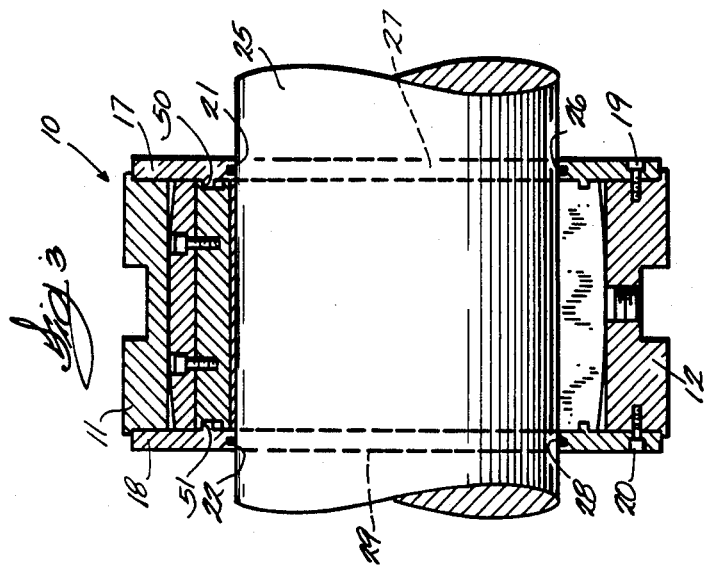
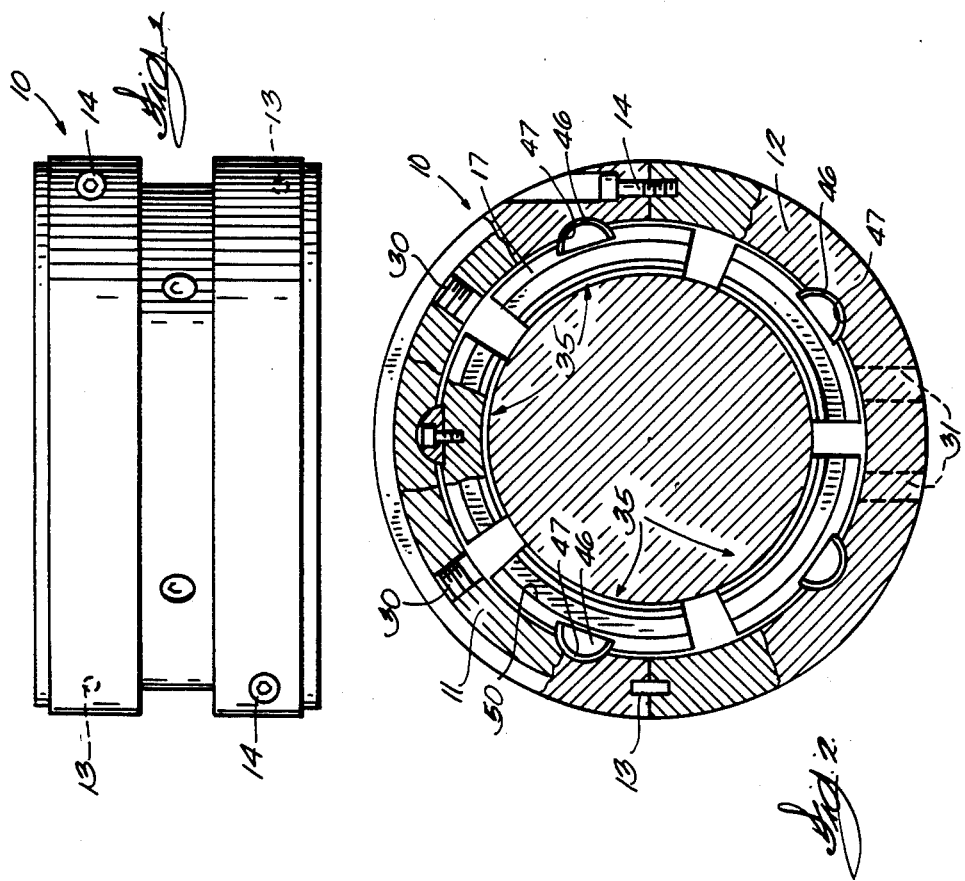

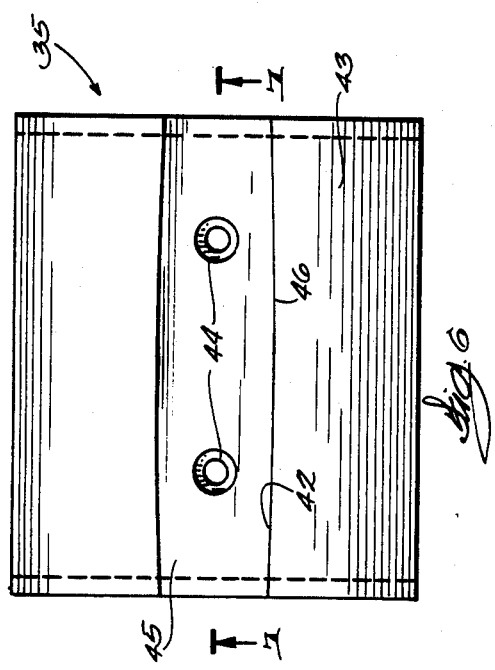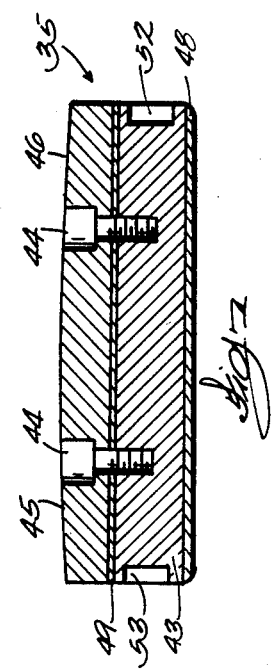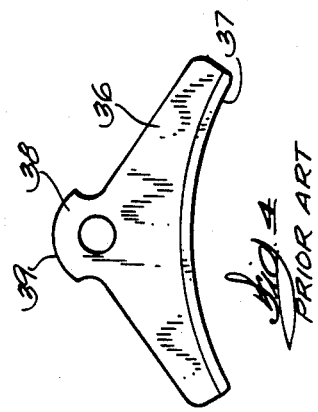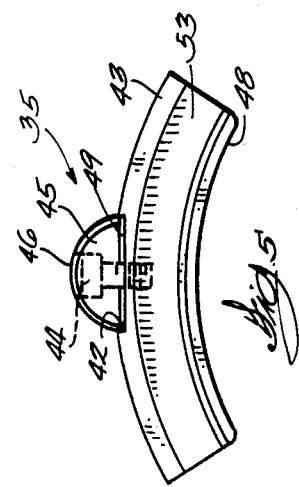

SEGMENTAL BEARING SHOE

BACKGROUND OF THE INVENTION

The invention relates to segmental bearings which may be either journal bearings or thrust bearings. More particularly, the invention covers an improved shoe assembly for a segmental bearing which includes a novel pivot for pivotally supporting the shoe in the bearing housing.

It is common practice to form the bearing surfaces of large journal bearings and thrust bearings of a plurality of bearing shoes. Each shoe is supported in the bearing housing for limited pivotal movement so that they are automatically aligned by the rotary member to distribute the bearing load evenly over the entire bearing surface. To this end, each shoe is provided with a protruding boss or pivot presenting an arcuate convex surface for engagement with a complementary concave surface formed in the supporting structure. Such construction enables the shoes to rock about the arcuate surfaces for aligning the shoes to accommodate the loading applied by the rotary member.

Such type of bearing construction is disclosed in U.S. Pat. No. 3,297,371 issued to Salzman on Jan. 10, 1967 and U.S. Pat. No. 4,026,613 issued to Moravchik on May 31, 1977. Both of these patents show the bearing shoes constructed in accordance with the conventional practice of forming the pivot integrally with the shoe itself so that the arcuate surface presented by the pivot is fixed relative to the bearing surface of the shoe.

It is therefore a general object of the present invention to provide an improved shoe assembly for segmental bearings.

Another object of the invention is to provide a shoe assembly having a removable pivot so that the spacing of the pivot relative to the bearing surface of the shoe can be adjusted to enable the characteristics of the bearing to be varied to meet the desired specifications.

A further object of the present invention to provide an improved shoe assembly for a segmental bearing in which the shoe is capable of aligning itself in any necessary direction to accommodate the loading applied by the rotary member.

Another object of the invention is to provide a segmental journal bearing shoe that is especially compact in its configuration.

It is also an object of the present invention to provide a segmental bearing shoe constructed so as to facilitate its manufacture while improving its operating efficiency.

SUMMARY OF THE INVENTION

The improved shoe assembly of the present invention comprises a conventional bearing shoe presenting a bearing surface for engagement with the rotating surface of a rotary member. However, instead of forming the pivot integrally with the body of the shoe, such pivot is formed separately and is removably secured to the body. To this end, the body of the shoe is provided with a longitudinal slot for receiving the pivot and the latter is attached thereto by screws or other suitable fasteners. With this arrangement shims can be added between the pivot and the body of the shoe, or removed therefrom, to adjust the clearance and stiffness and damping characteristics of the bearing. Moreover, the separate forming of the body of the shoe and the pivot facilitates manufacture of the assembly.

BRIEF DESCRIPTION OF THE DRAWINGS

FIG. 1 is an elevational view of a journal bearing utilizing segmental bearing shoes that incorporate features of the present invention;

FIG. 2 is a sectional view of the bearing illustrated in FIG. 1 taken transversely to the axis of the bearing and illustrating the bearing shoes of the present invention incorporated in the bearing assembly;

FIG. 3 is a sectional view taken through the axis of the bearing shown in FIG. 1 and depicting a shaft journaled in the bearing.

FIG. 4 is an elevational view illustrating a segmental bearing shoe constructed in accordance with the prior art;

FIG. 5 is an elevational view showing a segmental bearing shoe assembly constructed in accordance with the teachings of the present invention;

FIG. 6 is a plan view of the bearing shoe assembly depicted in FIG. 5; and

FIG. 7 is a sectional view taken along the plane represented by the line 7—7 in FIG. 6.

DETAILED DESCRIPTION OF THE PREFERRED EMBODIMENT

Reference is now made more particularly to the drawings and specifically to FIGS. 1-3 thereof which illustrate a journal bearing in which the bearing surface is formed of a plurality of segmental bearing shoes incorporating the features of the present invention. As there shown, the bearing comprises an exterior ring 10 which may be formed as a unitary structure but in the illustrated embodiment is constructed of two halves 11 and 12 that are accurately positioned relative to each other by dowels 12 and secured together by screws 14 as clearly illustrated in FIG. 2.

As best shown in FIG. 3, a pair of annular side walls 17 and 18 are attached to the respective sides of the ring 10 with the side wall 17 being attached thereto by screws 19 while the side wall 18 is secured to the opposite side of the ring 10 by screws 20. The side wall 17 is provided with a central bore 21 which is in alignment with a central bore 22 formed in the side wall 18 for receiving the shaft 256 which is journaled in the bearing.

An annular groove 26 is formed in the wall of the bore 21 of the side wall 17 for receiving an oil seal 27 which embraces the shaft 25 for preventing the escape of oil within the bearing. In like manner, the wall of the bore 22 of the side wall 18 is provided with an annular groove 28 for receiving an oil seal 29 to prevent the escape of oil from the opposite side of the bearing. As clearly shown in FIG. 12, oil is admitted through openings 30 in the ring 10 and escapes from the bearing through openings 31.

The shaft 25 is rotatably supported within the ring 10 by a plurality of bearing shoe assemblies, each of which is generally identified by the reference numeral 35. In the illustrated embodiments five bearing shoe assemblies 35 are provided for rotatably supporting the shaft 25. A greater or lesser number of shoe assemblies 35 may be provided depending upon the requirements of the particular design.

The present invention is directed to improving the construction and operating efficiency of the bearing shoe assembly 35. A bearing shoe assembly incorporating the feature of the present invention is clearly depicted in FIGS. 5-7. It has been the general practice of those skilled in the art of segmental bearing construction to form the bearing shoe as an integral structure as shown in FIG. 4. The journal bearing shoe illustrated in FIG. 4 is disclosed in previously mentioned U.S. Pat. No. 3,297,371 to Salzman and it will be noted that this bearing shoe includes a body 36 with a bearing surface 37 and a pivot 38 opposite the bearing surface 37. The pivot 38 presents an arcuate surface 39 about which the bearing shoe rocks to enable it to align itself in response to the loading applied by the rotary member. It will be noted that prior journal bearing shoe depicted in FIG. 4 is a unitary structure with the pivot 38 being integrally formed with the body 36. A similar construction is provided for the bearing shoe disclosed in U.S. Pat. No. 4,026,613 to Moravchik.

Contrary to the prior art practice, the present invention provides for constructing the bearing shoe assembly of two parts as shown in FIGS. 5-7 and comprising a bearing shoe body 43 having a slot 42 for receiving a separate pivot 45 that is attached therein by screws 44. The pivot 45 presents a convex surface 46 of semicircular cross section for engagement with a complementary concave semicylindrical surface 47 formed in the ring 10. The longitudinal convex surface of pivot 45 has a configuration with a radius of curvature, at all intervals, more than twice the length of that of the semicylindrical surface. It will be noted that the spacing of the surface 46 of the bearing shoe 35 from its bearing surface 48 is less than the spacing of the arcuate surface 39 from the bearing surface 34 in the prior art journal bearing shoe illustrated in FIG. 4. This results in a more compact complete journal bearing assembly.

The ring 10 is provided with five concave surfaces 47 of semicircular cross section equally spaced about the inner diameter for receivng the five arcuate convex surfaces 46 of the five shoe assemblies within the ring 10. The axes of the arcuate surfaces are parallel to the axes of the shaft 25 so that the shoe assembly 35 is able to rock about the cylindrical surfaces for adjusting its position to accommodate the loading applied by the rotary shaft 25. The construction of the pivot 45 independently of the body 43 of the bearing shoe facilitates manufacture of the units as the arcuate surfaces can be readily machined. Moreover, the spacing of the convex surface 46 of the pivot 45 can be readily adjusted relative to a bearing surface 48 formed on the body 43 opposite the pivot 45 for engagement with the rotating surface of the shaft 25.

Such adjustments can be readily completed by simply inserting shims 49 in the slots 42 under the pivot 45 to adjust its spacing from the bearing surface 48. One shim 49 is shown in FIGS. 5 and 7 but it should be understood that any number of shims, or none, can be employed to meet the particular situation. Such addition and removal of shims may influence the bearing performance. Thus, the addition of shims in this location will serve to increase the distance between the cylindrical surface 46 of the pivot 45 and the bearing surface 48 to reduce clearance and increase the stiffness and damping characteristics of the bearing. On the other hand, the removal of such shims will increase clearance and decrease the distance between the cylindrical surface 46 and the bearing surface 48 to in like manner decrease the stiffness and damping characteristics of the bearing.

As clearly shown in FIG. 7, the surface 46 of the pivot 45 is of a slightly convex configuration along its length. On the other hand, the concave semicylindrical surface 47 of the ring 10 proceeds in a straight line, and as a result, the bearing assembly 35 can rock relative to the concave surface 47 in a direction transversed to the rocking established by the pivot 45. This increases the ability of the bearing assembly 35 to adjust the position of its bearing surface 48 relative to the rotating surface of the shaft 25.

The concept of providing an arcuate configuration to the top of the surface 46 is old in the art. It has been recognized that by providing such an arcuate surface, the shoe can pivot about the axis of the surface 46 as well as rock a limited amount in a direction transverse to that pivoting movement and thereby increase the ability of the shoe to align itself for accommodating the load applied by the rotating member. However, the applicants here have found that if the sides of the surface 46 are also formed in a longitudinal convex arcuate configuration, as shown in FIG. 6, greater mobility of the shoe to align itself is obtained and superior engagement of the bearing surface 48 with the surface of the rotating shaft 25 is obtained. Therefore, according to the present invention, not only is the top of the surface 46 arced along its length as shown in FIG. 7, but a similar longitudinal convex arcuate configuration is provided along the sides of the surface 46 as depicted in FIG. 6. The production of such configuration is facilitated by the fact that the pivot 45 is fabricated separately from the body 43.

The side walls 17 and 18 are provided with arcuate ribs 50 and 51 respectively, as shown in FIG. 3, for engagement with complementary arcuate grooves 52 and 53 formed in the sides of the bearing shoe 35 as illustrated in FIG. 7. The ribs 50 and 51 are loosely fitted in the grooves 52 and 53 to retain the shoes in place for facilitating assembly.

From the foregoing detailed description of the illustrative embodiments set forth herein to exemplify the present invention, it will be apparent that there has been provided an improved bearing shoe for use in segmental bearings. The pivot of the bearing shoe is formed separately from the body of the shoe and then attached to the body by suitable fasteners so that it can be removed. As a result, the spacing of the pivot from the bearing surface of the shoe can be adjusted to change the stiffness and damping characteristics of the bearing and the manufacture of the bearing shoe is facilitated.

Although the illustrative embodiment of the invention has been described in considerable detail for the purpose of disclosing a practical operative structure whereby the invention may be practiced advantageously it is to be understood that the particular apparatus described is intended to be illustrative only and that the novel characteristics of the invention may be incorporated in other structural forms without departing from the spirit and scope of the invention as defined in the subjoined claims.

The principles of this invention having now been fully explained in connection with the foregoing description, we hereby claim as our invention:

1. A segmental bearing assembly that rotatably supports a member comprising a housing having a plurality of recesses with each recess presenting an elongated concave surface; a bearing shoe body supported in the housing; a bearing surface on said body for engagement with the rotating surface of the member, separately fabricated elongated pivot removably mounted on the surface of said body that is opposite said bearing surface; a convex surface extending longitudinally of said pivot for engagement with the concave surface of said recess to enable the bearing shoe to pivot relative to the housing; and at least one fastener attaching said pivot to said body; a slot formed in the surface of said body for receiving said pivot to secure said pivot in position on said body;

wherein the surface of said elongated pivot is semicircular in cross section, the outer extremity of said surface of said pivot being arced longitudinally to form a convex configuration along the length of the pivot, said convex configuration with radius of curvature, at all intervals, more than twice the length of that of the said semicylindrical surface, to enable the bearing shoe to rock in both directions so that is will align itself to accommodate the loading applied by the rotating member.

2. A bearing shoe assembly according to claim 1 including a shim in said slot for adjusting the spacing of said pivot from said bearing surface.

3. A bearing shoe according to claim 1 wherein said bearing surface on said body is of arcuate configuration for engagement with the rotating surface of a rotary member.

* * * * *